United States Patent [19]

Rey

[11] Patent Number: 4,497,764

[45] Date of Patent: Feb. 5, 1985

[54] EPOXY RESIN COMPOSITIONS OF ENHANCED CREEP RESISTANCE

[75] Inventor: S. Frank Rey, Houston, Tex.

[73] Assignee: Exxon Research & Engineering Co., Florham Park, N.J.

[21] Appl. No.: 428,832

[22] Filed: Sep. 30, 1982

[51] Int. Cl.$^3$ .......................... E04B 1/54; F16B 12/06
[52] U.S. Cl. ...................................... 264/261; 52/744; 523/428
[58] Field of Search ................... 52/514, 309.3, 309.4, 52/744; 264/36, 261, 34; 523/427, 428, 524

[56] References Cited

U.S. PATENT DOCUMENTS

| | | | |
|---|---|---|---|
| 3,194,853 | 7/1965 | Weise | 52/744 |
| 3,265,647 | 8/1966 | Schaffer | 264/36 |
| 3,396,138 | 8/1968 | Weller . | |
| 4,130,692 | 12/1978 | Anderson | 428/524 |
| 4,342,673 | 8/1982 | Wolfrey | 523/427 |
| 4,352,262 | 10/1982 | Edelmann | 52/744 |
| 4,392,335 | 7/1983 | Heiman | 52/514 |

*Primary Examiner*—John E. Murtagh
*Attorney, Agent, or Firm*—Roland A. Dexter

[57] ABSTRACT

A room temperature aged epoxy resin grout utilizing a mixture of the diglycidyl ether of bis-phenol A and a siliceous aggregate such as sand is markedly improved in creep deformation performance when a reactive diluent such as the diglycidyl ether of cyclohexane dimethanol and a curing agent such as triethylene tetraamine are admixed with said grout.

4 Claims, No Drawings

EPOXY RESIN COMPOSITIONS OF ENHANCED CREEP RESISTANCE

This invention relates to epoxy resin compositions having improved creep resistance and more particularly, to polyepoxide compositions capable of being resinified at room temperature and exhibiting enhanced creep deformation performance.

BACKGROUND OF THE INVENTION

It is widely known that use of epoxy resins for many applications is prompted by the deformation resistance of such resins which, when cured are subjected to compressive forces and/or elevated temperatures. Epoxy resin compositions that are heat cured exhibit great resistance to and stand up well under abrasive environments as well. Such epoxy compositions utilizing particulate fillers such as silica and alumina have been sold for the surface coating of metal pipes and cement floors, for securing equipment to said coated floors, for installation and securing of anchor bolts to a wide variety of surfaces, and for the grouting of original installations of heavy equipments such as hammer mills and integral gas compressors.

These large integral gas compressors consist of an internal combustion engine driving a reciprocating gas compressor. Engine powder cylinders and compressor cylinders are mounted on a common crankshaft and cylinder block. Integral gas compressors typically operate at slow speeds, several hundred revolutions per minute, and develop several thousand horsepower. Crankshafts are large, typically some 14 inches in diameter and 20 feet long. Minor misalignment of main journal bearings is a serious operational problem. Integral gas compressors are typically installed on a concrete foundation block covered by a layer of aggregate filled epoxy grout. The epoxy grout aids in alignment and secure mounting and protects the concrete foundation from chemical attack. Some integral gas compressors suffer from gradual misalignment of the crankshaft main bearings which is detected by web deflection measurements. Limitations on web deflections to protect crankshafts, rods and bearings require that the compressor be realigned if these limits are exceeded. This often necessitates replacement of the epoxy grout at significant cost and loss of production due to down time. Many reasons have been suspected for the misalignment problem including some creep, shrinkage or thermal strain of the concrete foundation, creep of the compressor frame, or nonuniform creep of the epoxy grout due to nonuniformity of stress and temperature fields. Of these, creep of epoxy grout is studied here. Epoxy grouts consisting of resin, hardener and an aggregate filler system including sand, silane modified silica and alumina are marketed by numerous firms for use in mounting a wide variety of heavy equipment including gas compressor.

The use of silanes in resinous compositions to enhance various physical properties of an aggregate filled resinous product is widespread. Representative discussions of said uses include: U.S. Pat. No. 3,234,159 wherein acid-resistant cements (mortars) of improved tensile strength and very high electrical resistivity comprise silica sand containing a minor amount of phenol formaldehyde resin solids containing up to 10% of an amino functional silane;

U.S. Pat. No. 3,328,339 wherein a reinforced polymeric composition is improved in its physical properties such as increased flexural strength and modulus by reacting an organosilane coupling agent with the silane monomer prior to polymerization and thereafter chemically binding the resulting polymer to a siliceous mineral reinforcing agent;

U.S. Pat. No. 3,390,120 wherein the modulus and tear resistance of polyurethane polymer compositions are said to be enhanced by a kaolin clay modified by from 1 to 3% of an amino organosilane;

U.S. patent application Ser. No. 333,675 filed Dec. 23, 1981, now abandoned (of common assignee) wherein it is taught that amino silane treated siliceous aggregate can be utilized as an additive to epoxy compositions to markedly increase its chemical and temperature resistance while retaining the useful workability and abrasion resistance of said compositions.

It is an object of this invention to provide an epoxy resin composition of enhanced resistance to creep deformation while retaining its resistance to adverse chemical and/or elevated temperature environments while retaining its resistance to abrasion.

SUMMARY OF THE INVENTION

It has been discovered that the combination of a diglycidyl ether of bisphenol A with a reactive diluent as represented by the diglycidyl ether of cyclohexane dimethanol reacted with a converter represented by triethylene tetraamine in the presence of a major amount of particulate aggregate results in an epoxy grout of enhanced resistance to creep deformation.

In accordance with this invention there has been provided an epoxy resin composition comprising:
(a) an epoxy resin having at least two

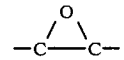

groups per molecule;
(b) a reactive diluent represented by the diglycidyl ether of cyclohexane dimethanol;
(c) a converter represented by triethylene tetraamine in a sufficient amount to cure said epoxy resin at about room temperature; and,
(d) a major amount of an aggregate filler having a particulate size ranging from 5 to 400 mesh.

More particularly, this invention provides an epoxy resin comprising:
(a) an epoxy resin represented by the diglycidyl ethers of bisphenol A;
(b) reactive diluent represented by the diglycidyl ether of cyclohexane dimethanol in an amount ranging from 0.3 to 1, preferably 0.5, part by weight per weight part of said epoxy resin;
(c) at least an effective amount of triethylene tetraamine converter; and,
(d) from 4.5 to 5.5, preferably 5, parts by weight of a siliceous aggregate per part by weight of the combined weight of (a), (b) and (c).

A highly useful composition according to this invention comprises:
(a) from 10 to 20, preferably 16 to 18, weight percent of any epoxy resin diluted with about 0.5 part by weight per part by weight of said resin of the diglycidyl ether of cyclohexane dimethanol and at least an effective amount of triethylene tetraamine to cure said epoxy resin at about room temperature; and, (b) from 80 to 90 parts by weight of a siliceous aggregate having a particulate size ranging from 8 to 400 mesh; with from 20 to 30, preferably 25, weight percent of siliceous aggregate having a particulate size ranging from 100 to 400 mesh, said weight percent being based on the total weight of said composition.

DETAILED DESCRIPTION OF THE INVENTION

Epoxy Resin

The resinous epoxides suitable for use in the present invention comprise those compounds having at least two epoxy groups, i.e., at least two

groups per molecule. The polyepoxides may be saturated or unsaturated, cycloaliphatic, aromatic, heterocyclic or preferably aliphatic, and, may be substituted, if desired, with substituents such as chlorine atoms, hydroxyl groups, ether radicals, and the like. They may also be monomeric or polymeric. The epoxy may be either present as a terminal or interior group.

Preferred polyepoxides of this type are the glycidyl polyethers of dihydric phenols produced by this method from dihydric phenols and epichlorohydrin as fully described along with a wide variety of other polyepoxides in U.S. Pat. No. 3,396,138.

Typical of the epoxy resins which may be employed are the epichlorohydrin-bis-phenol A type sold under the trademarks "Epon Resins" (Shell Chemical Corporation), "Gen Epoxy" (General Mills), "DER Resins" (Dow Chemical Corporation), "Araldite" (Ciba), "ERL Resins" (Bakelite Corporation), "Epi-Rez" (Celanese Corporation), and "Epiphen" (The Borden Company).

Reactive Diluent

The reactive diluent is a low viscosity cycloaliphatic diepoxide which will fully react in the admixture with the epoxy resin and become a part of the cross-linked resin structure. The reactive diluent must have a viscosity ranging from 49 to 100 cps at 25° C. so that when admixed with the epoxy resin provides a viscosity at 25° C. ranging from 500 to 1000 cps. A highly suitable reactive diluent is the diglycidyl ether of cyclohexane dimethanol with a viscosity of 60 cps at 25° C. For the admixture, a sufficient amount of reactive diluent is provided to give the mixture a viscosity of from 500 to 1000 cps at 25° C. which has been found to usually range from 3 to 1, preferably 2, parts of epoxy resin per part by weight of reactive diluent.

Converter

As the cross-linking compounds, i.e. converter for the epoxy resin compositions of the invention, an alkylene polyamine has been found surprisingly useful. The epoxy resin-reactive diluent-converter admixture generally represents from 10 to 20, preferably 15 to 19, optimally 16 to 18, to 18, weight percent of the grout with the balance being weight percent of the grout with the balance being siliceous aggregate. With triethylene tetraamine as the converter, an effective amount to provoke room temperature cross linking is 1 weight part of converter for 8 parts of resin admixture with a ratio of 1 part of converter to 7.7 parts by weight of resin admixture preferred.

Silica Aggregate

The siliceous aggregate employed as filler in the present invention whould have an average particle size not greater than 5 mesh and may range in average size from 8 mesh to 500 mesh. It is preferred to employ filler having an average particle size between 8 and 400 mesh as defined by the U.S. Standard Sieve Series ASTM E-11-61. It is the filler than enhances the physical resistance of the composition.

The siliceous aggregate includes silica sand, silane modified silica or alumina including sintered bauxite and mixtures thereof. Preferably the siliceous aggregate contains at least 25% silica sand. Useful mixtures include: from 70 to 80%, preferably 75%, silica with a size of 8 mesh to 100 mesh and from 20 to 30%, preferably 25%, silica flour having a nominal 300 mesh particle size. The siliceous aggregate represents from 80 to 90, preferably 85 to 89, optimally about 84 to 86 weight percent of the total composition. The siliceous aggregate can be treated with an amino organosilane according to the teachings of U.S. patent application Ser. No. 333,675, filed Dec. 23, 1981, if desired, to provide at least 0.5, usefully from 1 to 3, preferably 1.5 to 2.0 weight percent silane based on the weight of the aggregate whereby the chemical and temperature stability of the final epoxy resin grout is enhanced.

Generally, then in addition to the silica aggregate various types of inert pigments and fillers may also be incorporated into the aggregate compositions. As examples of such fillers may be mentioned blanc fixe, talc, pyrophyllite, diatomaecous earth, silica aerogel, and other like inert materials.

Color materials may be added to the compositions if desired. The coloring materials include organic and inorganic coloring materials. As examples may be mentioned titanium dioxide and carbon black. Coloring materials should be selected, however, so as to be non-reactive with the epoxy resins and other ingredients at atmospheric temperature, as otherwise this might cause poor storage stability and also affect retention of adhesiveness and abrasion resistance.

The composition of the present invention may also have therein, if desired, a lubricant, such as silicone oils, silicone jelly, petroleum jellies and so forth.

The manner in which the present invention may be practiced will be clear from the following examples which are to be considered illustrative rather than limiting.

EXAMPLE 1

This example illustrates the preparation of an epoxy resin composition which provides a non-hydraulic grouting composition of enhanced creep deformation performance. 5 parts by weight of siliceous aggregate consisting of 75% by weight of silica sand having a particle size ranging from 8 mesh to 100 mesh and 25% by weight of silica flour having a 300 mesh particle size was admixed with 1 part by weight of the epoxy resin-reactive diluent-converter admixture having a viscosity of about 800 cps at 25° C. The epoxy resin admixture was 2 parts by weight of Epon 828 (an epoxy resin consisting of the diglycidyl ether of bisphenol A) sold by the Shell Chemical Company, Houston, Tex., 1 part by weight of the reactive diluent MK-107 (the diglycidyl ether of cyclohexane dimethanol) sold by the Wilmington Chemical Corporation of Wilmington, Del.) and 0.39 parts by weight of triethylene tetraamine as the converter. This epoxy resin thus consisted of 9.8 weight percent of the diglycidyl ether Bisphenol A, 4.9 weight percent of the diglycidyl ether of cyclohexane dimethanol, 2 weight percent of triethylene tetraamine as a converter, 62.5 weight percent of a sand aggregate having a particle size ranging from 8 mesh to 100 mesh and 20.8 weight percent of silica flour having a particle size of 300 mesh. The epoxy resin cure, according to the invention is realized after 24 hours (a 1 day cure) at ambient temperature.

EXAMPLE 2

An additional epoxy resin composition which is essentially the same as that produced under Example 1 but utilizing as an aggregate the silica aggregate modified by about 1.5 wt% of amino silane resulting from the treatment of the aggregate with sufficient A-1100 (gamma-amino propyl triethoxy silane) sold by Union Carbide Corporation of New York, N.Y.) and thereafter heating the treated siliceous aggregate at 100° C. for 24 hours to dryness prior to admixture into the epoxy resin grout.

EXAMPLES 3-7

Five additional grouting compositions were prepared as in Examples 1 and 2 with changes in the diluent and converter and evaluated for creep deformation as seen from the following Table I.

TABLE I

CREEP DEFORMATION ANALYSIS
150° Test Data
Formulation

| Example | Epoxy | Diluent | Converter | Additive | Creep Deformation Results $\times 10^{-6}$ in$^2$/lb at 1000 hrs (165° F., 250 psi) |
|---|---|---|---|---|---|
| 3 | Epon 828 | BGE | TETA | — | 90 |
| 4 | Epon 828 | BGE | TETA | Amino* Silane | 88 |
| *1 | Epon 828 | MK107 | TETA | — | 18 |
| 2 | Epon 828 | MK107 | TETA | Amino* Silane | 16 |
| 5 | Epon 828 | BGE | Polyamide* | Amino* Silane | 200 |
| 6 | Epon 828 | BGE | Polyamide* | — | 150 |
| 7 | Epon 828 | MK107 | Polyamide* | Amino* Silane | 100 |

BGE represents butyl diglycidyl ether.
TETA represents triethylene tetraamine
*Polyamide purchased from Union Camp as "Uni-Rez 2355 E"
*Refers to the aminosilane treated aggregate as prepared in Example 2.

From Table I, it is seen that the epoxy resin grouts of the invention (the grouts of Examples 1 and 2) had about a ten fold creep deformation improvement over known systems (the grout of Example 6).

The invention in its broader aspect is not limited to the specific details shown and described and departures may be made from such details without departing from the principles of the invention and without sacrificing its chief advantages.

What is claimed is:

1. A method of filling the voids between the surface of a support floor and a contiguous bottom surface of a planar member supporting heavy equipment comprising the steps of (1) grouting fully said voids with an epoxy resin composition comprising:
    (a) an epoxy resin having at least two

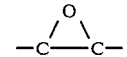

groups per molecule;
    (b) a reactive diluent represented by the diglycidyl ether of cyclohexane dimethanol;
    (c) a converter represented by triethylene tetraamine in sufficient amount to cure said epoxy resin at about room temperature; and,
    (d) a major amount of an aggregate having a particulate size ranging from 5 to 400 mesh;
    (2) curing said composition to hardness.

2. The method according to claim 1 wherein said epoxy resin is a diglycidyl ether of bisphenol A, said reactive diluent is present in an amount ranging from 0.3 to 1 part by weight per weight part of said epoxy resin and said aggregate ranges in an amount of from 4.5 to 5.5 parts by weight of a siliceous aggregate per part by weight of the combined weight of (a), (b) and (c).

3. The method according to claim 2 wherein there is 1 parts by weight of said siliceous aggregate per part by weight of said combined weight.

4. The method according to claim 1 wherein said epoxy composition comprises
    (a) from 10 to 20 weight percent of said epoxy resin diluted with about 0.5 part by weight per part by weight of said resin of the diglycidyl ether of cyclohexane dimethanol and at least an effective amount of triethylene tetraamine to cure said epoxy resin at about room temperature; and,
    (b) from 80 to 90 part by weight of a siliceous aggregate having a particulate size ranging from 8 to 400 mesh with from 20 to 30 weight percent of siliceous aggregate having a particulate size ranging from 100 to 400 mesh, said weight percent being based on the total weight of said composition.

* * * * *